United States Patent
Hoffman

(10) Patent No.: US 8,153,726 B2
(45) Date of Patent: Apr. 10, 2012

(54) HIGHLY OXYGEN PERMEABLE RIGID CONTACT LENSES FROM POLYACETYLENES

(75) Inventor: William C. Hoffman, Lakewood, CO (US)

(73) Assignee: The Lagado Corporation, Englewood, CO (US)

( * ) Notice: Subject to any disclaimer, the term of this patent is extended or adjusted under 35 U.S.C. 154(b) by 0 days.

(21) Appl. No.: 11/535,619

(22) Filed: Sep. 27, 2006

(65) Prior Publication Data

US 2007/0078245 A1    Apr. 5, 2007

Related U.S. Application Data

(60) Provisional application No. 60/722,740, filed on Sep. 30, 2005.

(51) Int. Cl.
| | |
|---|---|
| C08G 63/48 | (2006.01) |
| C08F 8/00 | (2006.01) |
| C08F 30/08 | (2006.01) |
| C08F 38/00 | (2006.01) |
| C08F 12/02 | (2006.01) |

(52) U.S. Cl. .......... 525/63; 525/100; 526/279; 526/285; 526/346

(58) Field of Classification Search ............ 525/63, 525/100; 526/279, 285, 346
See application file for complete search history.

(56) References Cited

U.S. PATENT DOCUMENTS

| | | | |
|---|---|---|---|
| 4,182,822 A | 1/1980 | Chang | |
| 4,343,927 A | 8/1982 | Chang | |
| 4,550,001 A | 10/1985 | Suminoe et al. | |
| 4,550,139 A * | 10/1985 | Arkles | 525/209 |
| 4,567,245 A | 1/1986 | Takamizawa et al. | |
| 4,578,230 A | 3/1986 | Neefe | |
| 4,657,564 A | 4/1987 | Langsam | |
| 4,711,943 A | 12/1987 | Harvey, III | |
| 4,755,193 A | 7/1988 | Higashimura et al. | |
| 4,778,868 A | 10/1988 | Higashimura et al. | |
| 4,824,522 A * | 4/1989 | Baker et al. | 216/24 |
| 4,833,262 A | 5/1989 | Kunzler et al. | |
| 4,859,215 A | 8/1989 | Langsam et al. | |
| 4,954,587 A | 9/1990 | Mueller | |
| 5,011,275 A | 4/1991 | Mueller | |
| 5,162,469 A | 11/1992 | Chen | |
| 5,177,165 A | 1/1993 | Valint, Jr. et al. | |
| 5,194,556 A | 3/1993 | Mueller et al. | |
| 5,314,960 A | 5/1994 | Spinelli et al. | |
| 5,371,147 A | 12/1994 | Spinelli et al. | |
| 5,391,669 A | 2/1995 | Sulc et al. | |
| 5,501,722 A | 3/1996 | Toy et al. | |

(Continued)

FOREIGN PATENT DOCUMENTS

EP    0 303 480 A2    2/1989

OTHER PUBLICATIONS

Arkles, B. (May 2001) "Commercial Applications of Sol-Gel-Derived Hybrid Materials," *MRS Bull.* 26:402-407.

(Continued)

*Primary Examiner* — William Cheung

(74) *Attorney, Agent, or Firm* — Greenlee Sullivan P.C.

(57) ABSTRACT

Provided are rigid contact lenses having high oxygen permeability and methods to make the same. The rigid contact lenses comprise a polyacetylene. Also provided are methods of making rigid high oxygen permeability contact lenses.

2 Claims, 1 Drawing Sheet

U.S. PATENT DOCUMENTS

| | | | |
|---|---|---|---|
| 5,525,691 | A | 6/1996 | Valint, Jr. et al. |
| 5,760,100 | A | 6/1998 | Nicolson et al. |
| 5,776,999 | A | 7/1998 | Nicolson et al. |
| 5,849,811 | A | 12/1998 | Nicolson et al. |
| 5,965,631 | A | 10/1999 | Nicolson et al. |
| 6,020,445 | A | 2/2000 | Vanderlaan et al. |
| 6,306,491 | B1 | 10/2001 | Kram et al. |
| 6,538,091 | B1 | 3/2003 | Matyjaszewski et al. |
| 6,649,722 | B2 | 11/2003 | Rosenzweig et al. |
| 6,774,178 | B2 | 8/2004 | Turek et al. |
| 2002/0016383 | A1 | 2/2002 | Iwata et al. |
| 2003/0181619 | A1 | 9/2003 | Matyjaszewski et al. |
| 2003/0236376 | A1 | 12/2003 | Kindt-Larsen et al. |
| 2004/0201820 | A1 | 10/2004 | Nakamura et al. |
| 2006/0226402 | A1* | 10/2006 | Kim et al. ............ 252/586 |
| 2007/0255014 | A1* | 11/2007 | Salamone et al. ............ 525/477 |

OTHER PUBLICATIONS

Budd et al. (Apr. 2004) "Microporous Polymeric Materials," *Mater. Today* :40-45.

*Chem. Eng. News* (Jan. 1984) 62:22.

Evlampieva et al. (2003) "Molecular and Electrooptical Characteristics of Poly(1-trimethylsilyl-1-propynes) with Varied Chain Regularity," *Russ. J. Gen. Chem.* 73:344-349.

Fujimori et al. (1988) "Synthesis of Poly[1-(trimethylsily)-1-propyne] with a Narrow Molecular Weight Distribution by Using NbCl$_5$ Catalyst in Cyclohexane," *Polym. Bull.* 20:1-6.

Hamano et al. (1988) "Copolymerization of 1-(Trimethylsilyl)-1-propyne with Disubstituted Hydrocarbon Acetylenes," *J. Polm. Sci. A* 26:2603-2612.

Jia et al. (1998) "Cross-Linking of Poly[1-(trimethyllsily)-1-propyne] Membranes Using Bis(arylazides),"*J. Polym. Sci. B* 36:959-968 (1998).

Masuda et al. (1983) "Poly[1-(trimethylsily)-1 propyne]: A New High Polymer Synthesized with Transition-Metal Catalysts and Characterized by Extremely High Gas Permeability," *J. Am. Chem. Soc.* 105:7473-7474.

Masuda et al. (1991) "Glow-Discharge-Induced Graft Polymerization of Acrylic Acid onto Poly[(1-(trimethylsilyl)-1-propyne] Film," *J. Appl. Polym. Sci* 43:423-428.

Masuda et al. (2001) "Poly[1-(trimethylsilyl)-1-propyne] and Related Polymers: Synthesis, Properties and Functions," *Prog. Polym. Sci* 26:721-798.

Morisato et al. (1996) "Synthesis and Gas PermeationProperties of Poly(4-Methyl-2-Pentyne)," *J. Membrane Sci.* 121:243-250.

Takada et al. (1985) "Gas Permeability of Polyacetylenes Carrying Substituents," *J. Appl. Polym. Sci.* 30:1605-1616.

Wavhal and Fisher. Membrane Surface Modification by Plasma Induced Polymerization of Acrylamide for Improved Surface Properties. Langmuir 19:79-85 (2002).

International Search Report, International Application No. PCT/US06/37703, Nov. 26, 2007, 2 pages.

\* cited by examiner

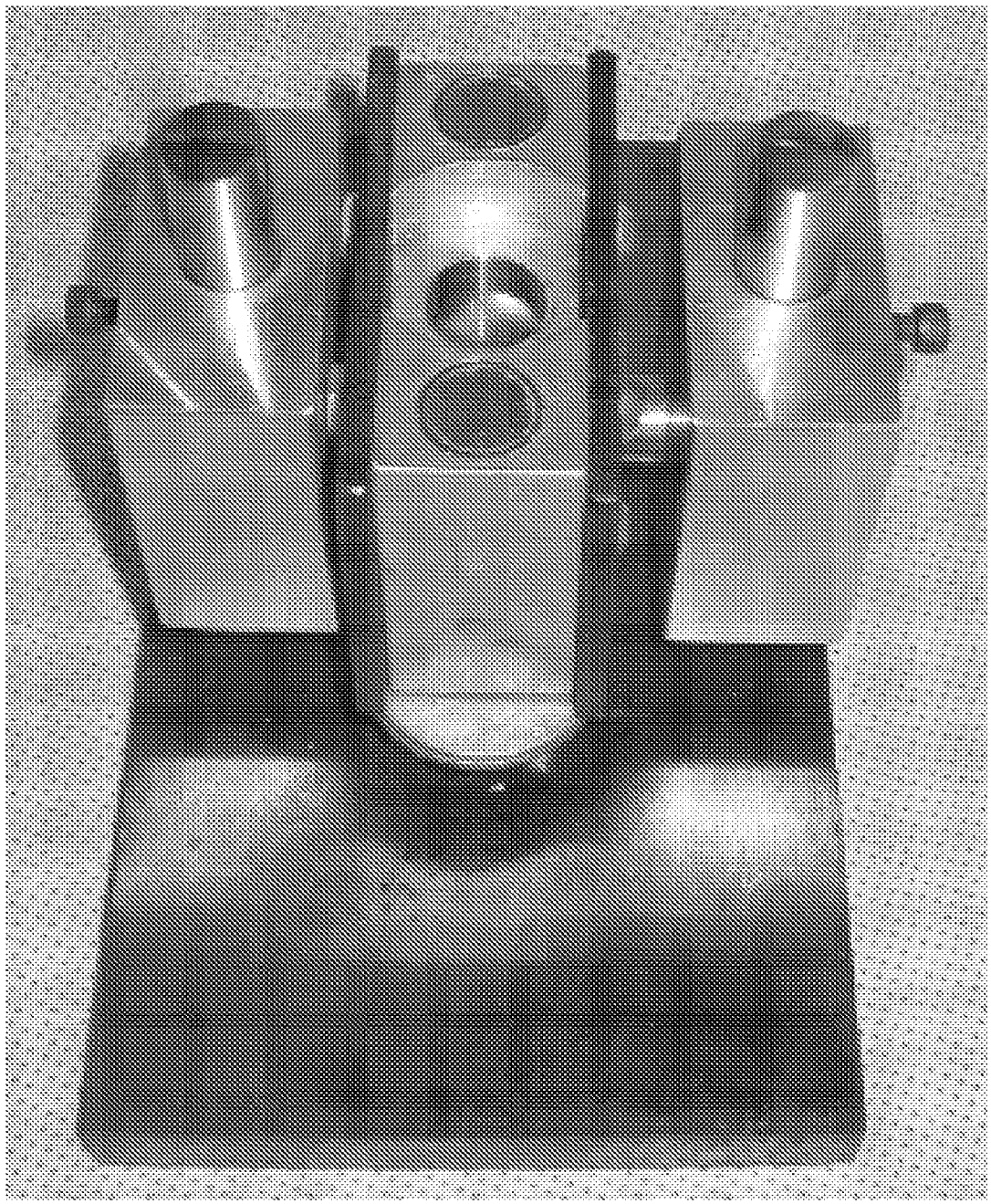

HIGHLY OXYGEN PERMEABLE RIGID CONTACT LENSES FROM POLYACETYLENES

CROSS-REFERENCE TO RELATED APPLICATIONS

This application claims priority from U.S. provisional application Ser. No. 60/722,740, filed Sep. 30, 2005, the disclosure of which is hereby incorporated by reference to the extent not inconsistent with the disclosure herein.

BACKGROUND OF THE INVENTION

This invention relates to contact lenses, in particular, to contact lenses having high oxygen permeability. The cornea is avascular, so the oxygen required for eye health must be transmitted from the atmosphere. If contact lenses are worn, the atmospheric oxygen transfer is blocked. Therefore, contact lenses must be oxygen permeable enough to transmit sufficient oxygen to the cornea. If sufficient oxygen is not transmitted to the cornea, comfort and eye health are affected. The highest oxygen permeability of rigid gas permeable (RGP) contact lenses is currently around 100 barrers. A RGP contact lens having higher oxygen permeability is desired.

Poly(trimethylsilylpropyne), PTMSP, was first prepared by Masuda in 1983 (ref 1). The high oxygen permeability of PTMSP was first announced in the Jan. 2, 1984 issue of Chemical and Engineering News (ref 2). PTMSP has the highest oxygen permeability of any known polymer, around 6000 barrers. This is ten times the oxygen permeability of polydimethylsiloxane, previously known as the most highly oxygen permeable polymer. Many attempts have been made to produce polymers with higher oxygen permeabilities than PTMSP, but these attempts have been unsuccessful so far.

The use of polyacetylenes including PTMSP to make contact lenses having higher oxygen permeability than current materials would be desirable, however, contact lenses from polyacetylenes are not known. Conventional methods to produce RGP contact lenses do not work for polyacetylenes. Existing RGP contact lenses are machined from polymer blanks or cast in static molds. Polyacetylenes do not lend themselves to these techniques to form contact lenses. Also, polyacetylenes are very hydrophobic and unsuitable for contact lens use directly. Existing methods to make contact lenses add wetting agents (hydrophilic monomers such as methacrylic acid, n-vinyl-2-pyrrolidone or hydroxyethyl maetacrylate) to the monomer formulation. This technique cannot be used with polyacetylenes.

A method for forming contact lenses that have high oxygen permeability from polyacetylenes is needed.

SUMMARY OF THE INVENTION

Provided are rigid contact lenses having high oxygen permeability and methods to make the same. More specifically, provided is a rigid contact lens having high oxygen permeability comprising a polyacetylene. In one embodiment, the polyacetylene is PTMSP. In one embodiment, the polyacetylene is incorporated in a copolymer. In one embodiment, the oxygen permeability of the rigid contact lens is above 50 barrers. The rigid contact lens may further comprise one or more optical additives. Optical additives include: wetting agents, crosslinkers, dyes, pigments, UV absorbing materials, and IR absorbing materials.

Also provided are methods of making rigid high oxygen permeability contact lenses. One method comprises: providing a polymer solution of a polyacetylene in a volatile solvent; and preparing a lens from the polymer solution. The lens may be prepared from the polymer solution by introducing the polymer solution into a lens-mold; spinning the lens-mold to evaporate at least a portion of the solvent, forming a lens; and removing the lens from the lens-mold. The polymer solution may have any suitable concentration of polymer, including from 1 to 20% polymer by weight. The polymer solution may include a copolymer of more than one polyacetylene polymers.

Another method provided for making a rigid high oxygen permeability contact lens comprises: providing a polyacetylene polymer or copolymer of two or more polyacetylenes that has a softening point and glass transition temperature suitable for compression or injection molding; forming contact lens blanks by compression or injection molding. The softening point and glass transition temperatures suitable for compression or injection molding are known in the art without undue experimentation. In one example, the softening point is below about 200° C. and the glass transition temperature is below about 200° C.

Also provided is a method of making a rigid high oxygen permeability contact lens comprising: providing a solution of a polyacetylene and one or more monomers, forming a polyacetylene blend; polymerizing the polyacetylene blend, forming a polymerized polyacetylene blend; forming a contact lens from the polymerized polyacetylene blend. In one embodiment, the monomer is a monomer used to form contact lenses, as known in the art. One particular example of a useful monomer is t-butyl styrene. Another particular example of a useful monomer is 4-methyl-1-pentene. In one embodiment, the polyacetylene blend contains more than 2% by weight polyacetylene.

In one embodiment of the methods provided, the polyacetylene polymer is selected from the group consisting of polymers formed from 1-alkynes. One example of a polymer formed from a 1-alkyne is poly(trimethylsilylpropyne).

As used herein, the terms "polyacetylene" or "polyacetylenes" or similar terms may include copolymers and mixtures of different polyacetylenes.

"Rigid gas permeable" (RGP) contact lens or "rigid contact lens" or "gas permeable contact lens" are intended to be interchangeable terms and mean a contact lens that allows at least some oxygen to pass through the lens.

As used herein, "oxygen permeability" (Dk) is the rate of oxygen flux under specified conditions through a contact lens material of unit area and unit thickness, when exposed to a defined pressure difference. As used herein, "high oxygen permebilility" means higher than 50 barrers. High oxygen permeability includes 50-100, 100-250, 100-500, 500-1000, 1000-3000, 3000-5000 and higher than 5000 barrers, and all individual values and all ranges therein. It is intended that any permeability value or range included in the definition of high oxygen permeability be able to be included or excluded in a claim.

Polymers are prepared from polyacetylene monomers using means known in the art without undue experimentation, including the techniques described in the references listed herein. These polymerization techniques include the use of polymerization catalysts including transition metals of group V of the Periodic Table, including niobium and tantalum. The catalyst is used in any desired amount, including 0.01-20 mol %, preferably between 0.5 and 5 mol %, based on the monomer, as known in the art. Polymerization may be carried out using an initiator, including those known in the art, in any suitable amount, as easily determined by one of ordinary skill in the art without undue experimentation. For example, a quantity of an initiator equal in weight to 0.05 percent to about 2 percent of the weight of the mixture of monomers is preferably added thereto, except when Co-60 is used as a source of polymerization energy. Examples of initiators include 2,2'-azobis(2,4-dimethylvaleronitrile) ("VAZO 52"), 2,2'-azobis(2,4-dimethyl-4'-methoxy)valeronitrile ("Wako V-70"), azobisisobutyronitrile ("AIBN"), benzoinmethyl ether ("BME"), di(secbutyl)peroxydicarbonate ("SBC"), and isopropylperoxydicarbonate ("Ipp"). The initiator may also be acetyl peroxide, lauroyl peroxide, decanoyl peroxide, caprylyl peroxide, benzoyl peroxide, tertiary-butyl peroxypivalate, diisopropyl peroxycarbonate, and tertiary-butyl peroctoate.

Polymerization occurs at any suitable temperature and time, as easily determined by one of ordinary skill in the art without undue experimentation. Exemplary polymerization temperatures include from 30-100° C., 50-100° C., and 70-100° C., for a suitable time, for example 12-36 hours. If required, the polymerized product may be purified using any known method. Suitable solvents for polymerization are easily determined by one of ordinary skill in the art, and include hydrocarbons, including aromatic hydrocarbons, cycloaliphatic hydrocarbons, halogenated hydrocarbons, aliphatic hydrocarbons and mixtures thereof. Examples of suitable solvents include toluene, benzene, o-, m-, and p-xylenes, ethyl benzene, styrene, naphthalene, hexane, cyclohexane, methyl cyclohexane, ethyl cyclohexane, cyclohexene, n-pentane, hexanes, heptane, oxtane, heptene, petroleum ether, 1,2-dichloroethane, carbon tetrachloride, chloroform, 1,2,3-trichloropropane, trichloroethylene, chlorobenzene, chloroethylbenxene and mixtures thereof.

It is known in the art that the molecular weight of the polymer is affected by polymerization conditions, and by altering the polymerization conditions, the desired molecular weight of polymer can be attained. Some useful weight average molecular weight ranges include 1 million or higher, below about 1 million; below about 800,000; below about 500,000; below about 250,000; below about 100,000; below about 50,000; below about 10,000; between 10,000 and 50,000; between 50,000 and 100,000; between 1000,000 and 250,000; between 100,000 and 500,000; between 500,000 and 800,000; between 500,000 and 1,000,000. Polymerization conditions and alterations are easily determined by one of ordinary skill in the art without undue experimentation.

As used herein, "volatile solvent" means a solvent that at least partially dissolves the desired polymer or polymers and at least partially evaporates upon application of suitable volatizing conditions. It is preferred that the volatile solvent be completely removable or substantially completely removable (within 5% of completely removed) from the polymer.

Poly(trimethylsilylpropyne) is one example of a polyacetylene polymer useful in the invention. Other polyacetylene polymers useful in the invention include polymers formed from 1-alkynes and polymers formed from 1-alkynes having one or more substitutions at the 1-position, including hydrogen; C1-C6 branched or straight chain alkyl groups, including C1-C6 branched or straight chain alkyl groups substituted with one or more substituents as described herein; phenyl groups, including phenyl groups substituted with one or more substituents as described herein; one or more halogen atoms; silyl groups, including silyl groups optionally substituted with one or more substituents as described herein, which substituents include independently one or more hydrogen atoms, C1-C6 branched or straight chain alkyl groups and one or more halogens, particularly fluorine, chlorine and bromine, and other substituents known in the art. Some examples of suitable substitution groups are given in the examples herein, where each particular example is intended to be particularly described and may be used with other examples in a polyacetylene. The general formula for a polymer formed from a 1-alkyne (also known as polyacetylene) includes the repeating unit:

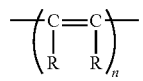

where the R's may be the same or different and are each independently selected from the group consisting of: hydrogen, C1-C6 branched or straight chain alkyl groups, including C1-C6 branched or straight chain alkyl groups substituted with one or more substituents as described herein; phenyl groups, including phenyl groups substituted with one or more substituents as described herein; one or more halogen atoms; one or more silyl groups that may be substituted with one or more substituents described herein, which substituents include independently one or more groups selected from the group consisting of: hydrogen, halogens, and C1-C6 alkyl groups; and other suitable substituents as known in the art. In the formula above, n is an integer and may be from 1 to the maximum polymerizable number, as easily determined by one of ordinary skill in the art. Some examples of n are from 100 to 100000 and all ranges and intermediate values therein.

Polyacetylenes having high measured oxygen permeabilities (for example over 200 barrers) that are useful in the invention include: poly[1-(trimethylsilyl)-1-propyne], poly[1-(n-propyl)-1-propyne], poly[(m-trimethylsilylphenyl)phenylacetylene], poly[(p-t-butylphenyl)phenylacetylene], poly[(p-trimethylsilyl)phenylacetylene], poly[1-(dimethylethylsilyl)-1-propyne], poly[1-(triethylsilyl)-1-propyne], poly[1-(2,4,5-trifluromethylphenyl)acetylene], poly[1-(2,4-trimethylsilylphenyl)acetylene], poly[1-(dimethylisopropylsilyl)-1-propyne], poly-[1-(p-trimethylsilylphenyl)acetylene], poly-[1-phenyl-2-(p-trimethylsilylphenyl)acetylene], poly-[2,4,5-tris(trifluoromethyl) phenylacetylene], poly-[(1,1,3,3-tetramethyl-1,3-disilabutyl)-1-propyne, poly[t-butylacetylene], poly[4-methyl-2-pentyne] and mixtures thereof. Other polyacetylene polymers are intended to be included, including where the groups attached to any silicon atom are chosen independently from one or more groups including H, C1-C6 alkyl groups, and/or halogens. In one embodiment of the invention, the polyacetylene contains a double bond and a silicon atom in the repeating unit.

As known in the art, various optical additives can be added into the contact lens formulation. Optical additives include wetting agents (such as MAA) crosslinkers (such as EGD), dyes, pigments, UV absorbing materials, IR absorbing materials, and other additives known in the art. After a polymer is formed, the polymer is formed into contact lenses by any conventional or otherwise suitable process. Contact lenses prepared using the methods decribed herein can be treated after formation, for example by using a surface treatment such as plasma treatment known in the art. Surface treatment is useful to make hydrophobic surfaces hydrophilic. Plasma oxidation is known to produce oxygen containing groups on the surface. Plasma grafting is known to bind a hydrophilic monomer (acrylic acid, MAA HEMA, etc.) to the suface. Plasma polymerization is also used to impart wettability.

In one embodiment, the polymer does not contain a halogen. In one embodiment, the polyacetylene contains one or more halogen atoms. In one embodiment, the monomers used to form the polymer are not a polymerizable fluoromonomer and either (1) a polymerizable hydrophobic hydrolyzable silicone monomer or (2) a polymerizable hydrophilic monomer. In one embodiment, the polymer is not a copolymer. In one embodiment, the polymer is a copolymer. In one embodiment, the polymer is not a copolymer formed from 1-trimethylsilyl-1-propyne and 1-(1',1',3',3'-tetramethyl-1',3'-disilabutyl)-2-propyne. In one example, the polymer does not contain an additive which is miscible with the polymer, has a boiling point >300° C. at atmospheric pressure, is soluble in a common solvent with the polymer and increases the selectivity ratio of $O_2/N_2$ by at least 15% over the polymer without the additive. In one example, the polymer does not contain an additive selected from the group consisting of: silicon oils, non-ionic surfactants, hydrocarbon oils, flame retardant additives, epoxides, natural oils, liquid poly(vinyl chloride) stabilizers, aromatic compounds containing nitrogen groups, aromatic compounds containing sulfur groups, and mixtures thereof.

BRIEF DESCRIPTION OF THE FIGURE

FIG. 1 shows an example of a press useful in preparing lenses.

DETAILED DESCRIPTION OF THE INVENTION

The invention may be further understood by the following non-limiting examples.

Three methods that can be used to prepare rigid oxygen permeable contact lenses from polyacetylenes, including PTMSP are described.

A first method to form high oxygen permeability lenses is rotational or spin casting. Spin casting can be used to cast polyacetylene lenses from concentrated solutions of the polymer in a volatile solvent. Exemplary solvents are toluene, benzene or hexane. Other solvents may be used, as easily determined by one of ordinary skill in the art without undue experimentation. The concentration of the polymer in solution may vary, depending on the process, as known in the art. Some suitable concentrations of polymer in solution are from 1 to 20% by weight and all individual values and intermediate ranges therein. Other examples of useful polymer concentrations are between about 3 to about 7% by weight and about 5% by weight. If the concentration of the polymer in the solution is too high, the solution becomes too viscous for spin casting. The solution is introduced into a suitable lens-mold as known in the art and the spin rate is adjusted as necessary to provide the desired level of solvent evaporation. A heat lamp or other heat source may be used to speed the evaporation of the solvent. Additional polymer solution may also be added as necessary as the evaporation proceeds. The rotational speed must be adjusted during the process to produce the desired form, as known in the art. After the lens has been formed, the lens-mold is removed. In one example, the lens-mold is placed in a vacuum oven to remove all traces of solvent. The lens is removed from the mold by techniques known in the art, for example, placing the mold in warm water. The lens is inspected and the edge polished if necessary.

After the lens has been manufactured, the polymer may be crosslinked using the method described by Jia in the Journal of Polymer Science (ref 12) and other methods known in the art. Alternatively, the polymer may be cross-linked prior to spin casting. In one example, 4,4-diazidobenzophenone is added to the polymer solution prior to spin casting. Crosslinking occurs when the lens is exposed to UV light at room temperature. Cross-linking improves the rigidity and stability of the lens and makes it insoluble in all solvents.

Other post-formation processes may be used to improve or alter the properties of the lens, as known in the art. Plasma grafting may be used to make the lenses hydrophilic and useable as contact lenses as known in the art. This technique has been described by several authors in the literature. Using the method of Masuda, acrylic acid is graft polymerized to the polymer surface. The wetting angle decreases from 90° to around 30° and remains stable over time. The surface of a finished lens is first activated in a glow discharge chamber. The lens is then placed in an aqueous solution of acrylic acid for 24 hours at 80° C. (ref 6). The lens may also be activated in an argon plasma. After grafting is complete, residual acrylic acid is extracted from the lens surface. The lens is then ready for use.

A second method to form high oxygen permeability lenses is compression or injection molding. PTMSP, as typically prepared, has a very high molecular weight (up to one million). The softening point occurs from 325° C. to 345° C. and the glass transition temperature is greater than 250° C. These high temperatures do not permit conventional melt processing techniques (ref 5). Other polyaceteylenes suffer from the same difficulty.

Compression or injection molding can be used to prepare lenses or lens blanks for use in making contact lenses. The literature describes methods of preparing PTMSP and other polyacetylenes with lower molecular weights than the maximum described above. For example, the catalyst-solvent combination of $NbCl_5$ and cyclohexane produces a much lower molecular weight distribution than maximally possible (ref 4). The resultant material can be compression or injection molded into lenses or lens blanks. Contact lenses may be machined from these blanks using conventional techniques. Finished lenses may be crosslinked and surface modified by graft polymerization as previously described, or otherwise finished, if desired and known in the art.

It is prefered that the softening point and glass transition temperature both be below 200° C. for use in compression or injection molding techniques. Other polyacetylenes and copolymers of other polyacetylenes including copolymers with PTMSP have lower softening points and glass transition temperatures which makes these polymers suitable for conventional melt processing techniques. For example, copolymers of trimethylsilylpropyne with 2-octyne, 4-octyne or 1-phenyl-1-propyne (ref 11) may be used. Examples of other polyacetylenes that may be used include poly(t-butylacetylene), poly(4-methyl-2-pentyne), poly(propylpentyne) and poly(4-t-butylphenylpropyne). These polymers have lower oxygen permeabilities than PTMSP (ref 5), however the permeabilities are still high enough to make them useful as contact lens materials.

Example of Compression Molding:

A two cavity mold was fabricated to produce polymer discs suitable for machining into lenses. An example of a mold is shown in FIG. 1. A 12 ton Carver Press with heated platens was used. Powdered PTMSP was placed in each mold cavity and the powder compressed until filled completely. The mold was then placed between the platens of the press and approximately 5 tons pressure applied. The platens were then gradually heated to 350° C. Pressure was maintained at 5 tons during heating. When flow was observed and the pressure decreased, pressure was increased to approximately 10 tons. Heat was turned off and the mold allowed to cool to room temperature. The mold was reversed, returned to the press and the polymer discs removed from the mold.

A third method to prepare high oxygen permeable lenses is the use of polymer blends and mixtures. Solutions of polyacetylenes including PTMSP in various monomers that are suitable for use in contact lenses can be polymerized using conventional techniques and cast into forms that can be machined into contact lenses using conventional techniques. For example, PTMSP can be dissolved in t-butyl styrene or styrene which can be polymerized in a tube or lens blank mold. t-Butyl styrene itself has an oxygen permeability of around 20 barrers and has been used in rigid gas permeable formulations. Adding PTMSP to the polymer increases the oxygen permeability significantly. For example, a 2% solution of PTMSP in t-butyl styrene was polymerized at 50° C. using azobisisobutyronitrile as the initiator in a polypropylene molding tube. The resulting polymer had the same hardness as poly(t-butyl styrene), was machinable into contact lenses and had an oxygen permeability of 40 barrers. Polymers with higher oxygen permeabilities may be prepared by increasing the PTMSP content. If the viscosity of solutions with higher PTMSP content is too high, higher temperatures when polymerizing, as known in the art.

After lenses are formed, post-formation processes, such as those described herein, can be used as desired, as known in the art.

Example Dk values of polyacetylenes that are useful in the invention: Polyacetylenes have the following Dk values:

| Polymer | Dk Value |
| --- | --- |
| poly(trimethylsilylpropyne) | 6,600 to 7,600 |
| poly(tetramethyldisilabutylpropyne) | 6,600 |
| poly(p-t-butylphenylpentyne) | 3,000 |
| poly(propylpentyne) | 2,700 |
| poly(methylpentyne) | 2,700 |
| poly(dimethylsiloxane) | 350 to 630 |

References:
1. Masuda, Isobe, Higashimura and Takada. JACS 105:7473 (1983)
2. C&E News. Jan 2, 1984. pg 22.
3. Morisato and Pinnau. J Membrane Sci 121:243 (1996)
4. Fujimori, Masuda and Higashimura. Polym Bull 20:1 (1988)
5. Masuda, Nagai, Nakagawa, Freeman and Pinnau. Polytrimethylsilylpropyne and Related Polymers: Synthesis, Properties and Functions.Prog Polym Sci 26: 721-798 (2001)
6. Masuda, Kotoura, Tsuchihara and Higashimura. Glow Discharge Induced Graft Polymerization of Acrylic Acid onto Polytrimethylsilylpropyne Film. J Applied Polym Sci 43: 423-428 (1991)
7. Wavhal and Fisher. Membrane Surface Modification by Plasma Induced Polymerization of Acrylamide for Improved Surface Properties. Langmuir 19:79-85 (2002)
8. Evlampieva, Pavlov, Zaitseva, Chirkova. Molecular and Electrooptical Characteristics of Polytrimethylsilylpropynes with Varied Chain Regularity. Russ J Gen Chem.73: 344-349 (2003)
9. Budd et al. Microporous Polymeric Materials. Materials Today April 2004, pg 40-45
10. Masuda et al. Gas Permeability of Polyacetylenes Carrying Substituents. J Applied Polym Sci 30:1605-1616 (1985)
11. Hamano et al. J Polym Sci, Part A 26:2603 (1988)
12. Jia and Baker. J Polym Sci Part B 36:959 (1998)
Patents:
U.S. Pat. No. 4,567,245 Takamizawa et al. Substituted Polyacetylene Copolymer
U.S. Pat. No. 4,755,193 Higashimura et al., Polymer and a Mrmbrane Having an Improved Gas Permeability and Selectivity
U.S. Pat. No. 4,833,262 Kunzler et al., Oxygen Permeable Polymeric Materials
U.S. Pat. No. 4,859,215 Langsam, Polymeric Membrane for Gas Separation When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein with an enabling disclosure are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individually or in any combination. One of ordinary skill in the art will appreciate that methods, starting materials, synthetic methods, and contact lens fabrication processes other than those specifically exemplified can be employed in the practice of the invention without resort to undue experimentation. All art-known functional equivalents, of any such methods, starting materials, synthetic methods, and contact lens fabrication processes are intended to be included in this invention. Whenever a range is given in the specification, for example, a temperature range, a time range, or a composition range, all intermediate ranges and subranges, as well as all individual values included in the ranges given are intended to be included in the disclosure to the extent they were individually listed. It is intended to be able to include or exclude any particular value or range of any variable from a claim.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention described and claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

In general the terms and phrases used herein have their art-recognized meaning, which can be found by reference to standard texts, journal references and contexts known to those skilled in the art. The definitions provided are to clarify their specific use in the context of the invention.

All patents and publications mentioned in the specification are indicative of the levels of skill of those skilled in the art to which the invention pertains.

One skilled in the art would readily appreciate that the present invention is well adapted to carry out the objects and obtain the ends and advantages mentioned, as well as those inherent therein. The contact lens compositions and methods and accessory methods described herein as presently representative of preferred embodiments are exemplary and are not intended as limitations on the scope of the invention. Changes therein and other uses will occur to those skilled in the art, which are encompassed within the spirit of the invention, are defined by the scope of the claims.

Although the description herein contains many specificities, these should not be construed as limiting the scope of the invention, but as merely providing illustrations of some of the embodiments of the invention. Thus, additional embodiments are within the scope of the invention and within the following claims. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

I claim:

1. A rigid contact lens having high oxygen permeability and a uniform composition comprising a PTMSP polyacetylene wherein the oxygen permeability of the lens is above 50 barrers, wherein the contact lens is molded to a rigid contact lens shape and allows some oxygen to pass through the lens to the cornea when in use, said lens made by the method comprising:
   providing a solution of a PTMSP polyacetylene and t-butyl styrene, forming a polyacetylene blend;
   polymerizing the polyacetylene blend, forming a polymerized polyacetylene blend;
   forming a contact lens from the polymerized polyacetylene blend.

2. A rigid contact lens having high oxygen permeability and a composition comprising a PTMSP polyacetylene wherein the oxygen permeability of the lens is above 50 barrers, wherein the contact lens allows some oxygen to pass through the lens to the cornea when in use, said lens made by the method comprising:
   providing a solution of a PTMSP polyacetylene and t-butyl styrene, forming a polyacetylene blend;
   polymerizing the polyacetylene blend, forming a polymerized polyacetylene blend;
   forming a contact lens from the polymerized polyacetylene blend.

* * * * *